US012802330B2

(12) United States Patent
Zheng et al.

(10) Patent No.: US 12,802,330 B2
(45) Date of Patent: Nov. 17, 2026

(54) METHOD FOR GENERATING AND VALIDATING SHADER SNAPSHOTS

(71) Applicant: ATI TECHNOLOGIES ULC, Markham (CA)

(72) Inventors: Yubao Zheng, Markham (CA); Fang He, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 143 days.

(21) Appl. No.: 18/539,945

(22) Filed: Dec. 14, 2023

(65) Prior Publication Data

US 2025/0200860 A1 Jun. 19, 2025

(51) Int. Cl.
*G06T 15/00* (2011.01)
*G06T 1/20* (2006.01)

(52) U.S. Cl.
CPC .............. *G06T 15/005* (2013.01); *G06T 1/20* (2013.01)

(58) Field of Classification Search
CPC .......... G06T 15/005; G06T 1/20; G06T 15/80
See application file for complete search history.

(56) References Cited

U.S. PATENT DOCUMENTS

2016/0379331 A1* 12/2016 Krutsch .................... G06T 1/20
345/506
2018/0033114 A1* 2/2018 Chen ........................ G06T 15/80
2021/0295801 A1* 9/2021 Chao ......................... G09G 5/10
2023/0326117 A1* 10/2023 Lee .......................... G06T 17/20

* cited by examiner

*Primary Examiner* — Devona E Faulk
*Assistant Examiner* — Donna J. Ricks

(57) ABSTRACT

A processing unit identifies errors in a sequence of shaders by capturing snapshots at different points in the shader sequence, wherein each snapshot represents image data or other data at the corresponding point in the shader sequence. A snapshot comparer compares the snapshots to corresponding reference snapshots, wherein each reference snapshot represents the expected data at the corresponding point in the sequence of shaders. Errors in one or more of the shaders in the shader sequence are identified based on the comparison.

20 Claims, 4 Drawing Sheets

METHOD FOR GENERATING AND VALIDATING SHADER SNAPSHOTS

BACKGROUND

In computer graphics and other image processing applications, it is sometimes useful to apply different effects to an image frame in order to achieve a desired image for display. To apply these effects, an image processing program employs one or more shaders, wherein each shader applies a different effect to the image frame or a portion thereof. Examples of shaders include texture shaders, vertex shaders, pixel shaders, geometry shaders, and the like. To apply more complex effects, such as frame interpolation, multiple shaders are employed to process the image frame in a sequence, with each shader performing a corresponding set of operations on an input frame and providing the resulting output frame to the next shader in the sequence, until the final output image frame is generated. However, because of the complexity of the different shader operations and their interactions, the output image sometimes includes visual artifacts, distortions, and other errors. To address these errors, a shader programmer adjusts the coding or parameters for one or more of the shaders in the shader sequence. However, it is frequently difficult to identify the particular shader in the shader sequence that caused a given error, thus requiring a relatively high amount of programming resources to locate and correct errors in a shader sequence.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
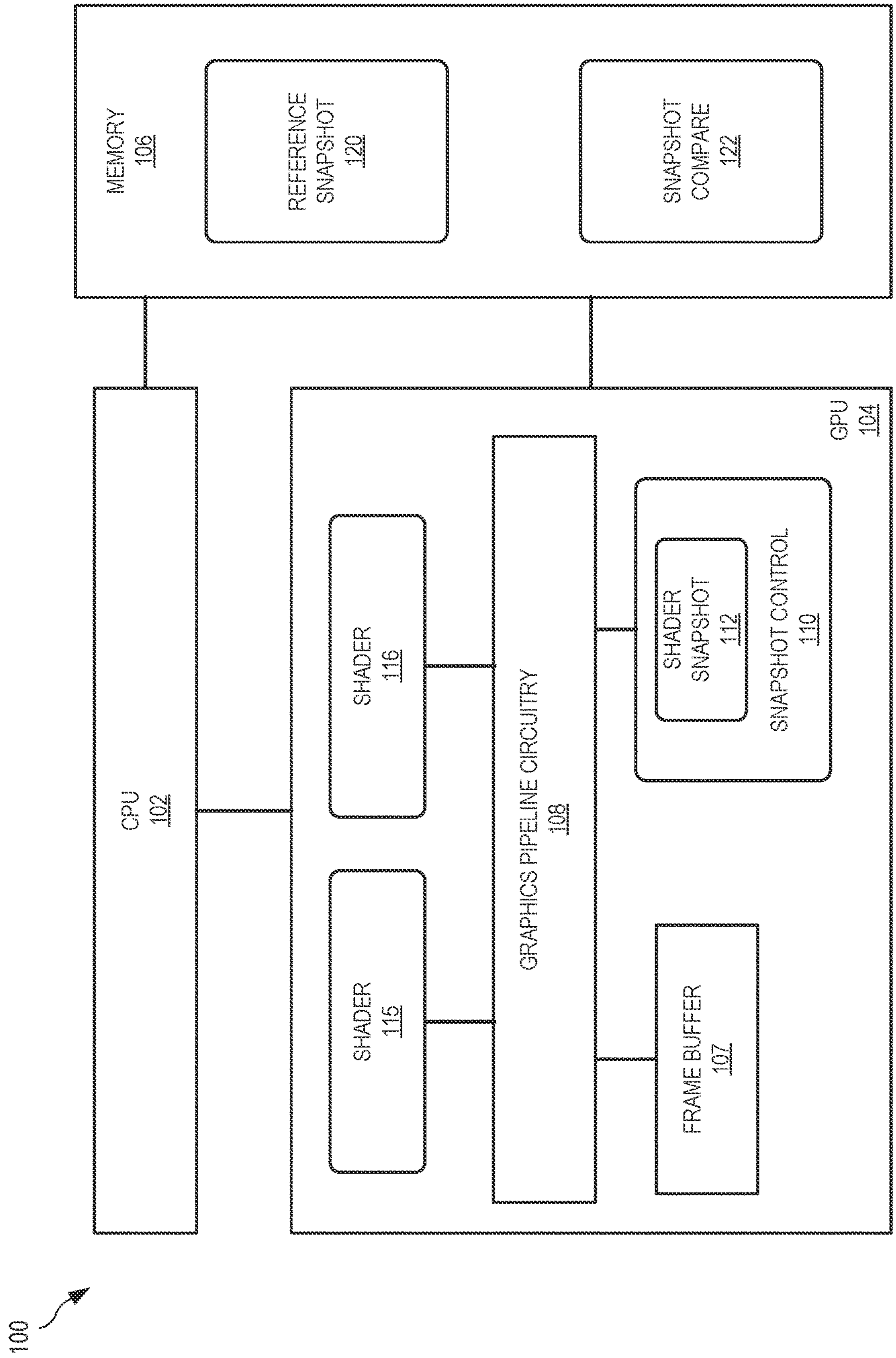
FIG. 1 is a block diagram of a processing system that generates snapshots of an image frame at different points in a shader sequence in accordance with some embodiments.

FIGS. 1-5 illustrate techniques for identifying errors in a sequence of shaders by capturing snapshots at different points in the shader sequence, wherein each snapshot represents image data (e.g., an image frame) or other data (e.g., motion data) at the corresponding point in the shader sequence. A snapshot comparer compares the snapshots to corresponding reference snapshots, wherein each reference snapshot represents the expected data at the corresponding point in the sequence of shaders. Errors in one or more of the shaders in the shader sequence are identified based on the comparison. Because the snapshots are captured at different points in the shader sequence, the techniques disclosed herein allow the particular error-causing shader to be identified relatively quickly and easily, thereby reducing the number of programming resources needed to identify and resolve errors in the shader sequence.

To illustrate, for some image processing operations, a sequence of shaders is employed, wherein an initial shader in the sequence receives input image data (e.g., an image frame), applies a corresponding effect to the input data, thereby generating output data, and provides the output data to the next shader in the sequence. The next shader applies a corresponding effect to the input data, provides the generated output data to the next shader, and so on until a final shader in the sequence generates final image output data (e.g., a final image frame). By sequencing shaders in this way, an image processing program is able to employ relatively complex image processing operations, such as frame interpolation. However, conventional development environments for shader sequences and image processing programs only allow the final image data to be captured for analysis. Accordingly, if the final image data includes an error, such as a visual artifact or distortion, it is difficult to identify which of the shaders in the sequence caused the error. Identification of the error-causing shader thus requires relatively costly analysis and testing of the shader sequence.

In contrast, using the techniques described herein, an image processing development environment (e.g., a software development kit) captures snapshots at intermediate points in the shader sequence. For example, in some cases the development environment captures a snapshot of the output data for each shader in the shader sequence. The development environment compares each captured snapshot to a corresponding reference snapshot, wherein a reference snapshot represents the expected output (that is, the expected output with no errors) for the corresponding shader. Thus, for example, in some embodiments the reference snapshot is pixel data representing the set of pixels expected to be generated by the corresponding shader. The comparison by the development environment indicates which, if any, of the pixels generated by the corresponding shader differ from the expected pixel data. Accordingly, the set of comparisons generated by the development environment provide a software developer to quickly and easily identify which of the shaders in the shader sequence is generating unexpected data, and thus to address errors in the shader sequence relatively quickly and using a smaller set of development resources.

In some embodiments, one or more of the reference snapshots are generated using a different shader framework, such as a different application program interface (API), different type of processing unit, different development environment, and the like, than is employed by the corresponding shader in the shader sequence. This allows the reference snapshot to be developed and generated by a shader with relatively high reliability but that, at least in some cases, has lesser performance than the corresponding shader in the shader sequence. However, in some cases, the differing shader framework results in the reference snapshot having different characteristics than the snapshot of the corresponding shader in the shader sequence. For example, if the reference snapshot is generated at a central processing unit (CPU) and the corresponding shader is executed at a graphics processing unit (GPU), in some cases the reference snapshot will differ from the corresponding shader snapshot because of different data rounding implementations at the different processing units. Accordingly, in some embodiments the snapshot comparer is configured to compare reference snapshots and corresponding shader snapshots based on a programmable error tolerance. This tolerance allows the development environment to account for the differences in the shader frameworks associated with the reference shader and corresponding shader in the shader sequence.

Referring now to FIG. 1, a processing system 100 configured to capture snapshots at different points in a shader sequence is presented, in accordance with some embodiments. The processing system 100 is generally configured to execute sets of instructions (e.g., computer programs) in order to carry out specified operations on behalf of an electronic device. For example, in some embodiments the processing system 100 is configured to execute programs that generate images for display (e.g., game programs, image editing programs, and the like). Accordingly, in different embodiments, the processing system 100 is incorporated in any one of a number of different electronic devices, such as a desktop computer, laptop computer, server, tablet, game console, smartphone, and the like.

In the illustrated embodiment, the processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus (not shown) to support communication between entities implemented in the processing system 100, such as the memory 106. Some implementations of the processing system 100 include other buses, bridges, switches, routers, and the like, which are not shown in FIG. 1 in the interest of clarity.

The processing system includes multiple processing units including a central processing unit (CPU) 102 and a graphics processing unit (GPU) 104. It will be appreciated that the techniques described herein are described with respect to example implementations at the GPU 104, but that in other embodiments the techniques described herein are, in different implementations, employed at one or more vector processors, coprocessors, graphics processing units (GPUs), general-purpose GPUs (GPGPUs), non-scalar processors, highly parallel processors, artificial intelligence (AI) processors, inference engines, machine-learning processors, other multithreaded processing units, scalar processors, serial processors, programmable logic devices (simple programmable logic devices, complex programmable logic devices, field programmable gate arrays (FPGAs), and the like or any combination thereof.

The CPU 102 includes one or more processor cores (not shown) generally configured to execute sets of instructions organized in the form of computer programs, including, for example an operating system (OS) and one or more application programs (referred to simply as applications). In the course of executing the sets of instructions, the processor cores generate operations, such as image generation or image modification operations, that are to be executed at the GPU 104. These image generation and image modification operations are referred to generally herein as image processing operations. To execute an image processing operation, the CPU 102 sends a command to the GPU 104 designating the operation as well as any data or parameters the GPU 104 is to use when executing the operation.

The GPU 104 is generally configured to carry out the image processing operations designated by the commands generated by the CPU 102. In at least some cases, these image processing operations cause the GPU 104 to render a set of rendered frames each representing respective scenes within a screen space (e.g., the space in which a scene is displayed) for presentation on a display (not shown). As an example, in the course of executing image processing operations the GPU 104 renders graphics objects (e.g., sets of primitives) for a scene to be displayed so as to produce pixel values representing a rendered frame stored at a frame buffer 107. The GPU 104 then provides the rendered frame (e.g., pixel values) to the display. These pixel values, for example, include color values (YUV color values, RGB color values).

To render the graphics objects, the GPU 104 employs graphics pipeline circuitry 108 using processor cores to render one or more graphics objects. The graphics pipeline circuitry 108 includes, for example, circuitry to implement one or more steps, stages, or instructions to be performed by in order to render one or more graphics objects for a scene. As an example, in some embodiments the graphics pipeline circuitry 108 includes circuitry that forms an input assembler stage, vertex shader stage, hull shader stage, tessellator stage, domain shader stage, geometry shader stage, rasterizer stage, pixel shader stage, output merger stage, or any combination thereof.

In embodiments, the graphics pipeline circuitry 108 includes one or more processor cores that each operate as a compute unit configured to perform one or more operations for one or more instructions. These compute units each include one or more single instruction, multiple data (SIMD) units that perform the same operation on different data sets to produce one or more results. For example, in some implementations the graphics pipeline circuitry includes one or more processor cores each functioning as a compute unit that includes one or more SIMD units to perform operations for one or more instructions. To facilitate the performance of operations by the compute units, the GPU 104 includes one or more command processors (not shown for clarity). Such command processors, for example, include circuitry configured to receive commands from the CPU 102 and initiate and control operations at the graphics pipeline 108 by providing data indicating one or more operations, operands, instructions, variables, register files, or any combination thereof to one or more compute units necessary for, In embodiments, one or more shaders (e.g., shaders 115 and 116) are implemented partially or fully as shader programs to be executed at the graphics pipeline circuitry 108 (e.g., at one or more processor cores operating as compute units). In some embodiments, the shaders 115 and 116 are compute shaders that, at least in some cases implement massive single-instruction-multiple-data (SIMD) processing so that multiple pixels are processed concurrently. In at least some embodiments, example graphics pipeline circuitry 108 implements a unified shader model so that all the shaders executed at the graphics pipeline circuitry 108 have the same execution platform on the shared massive SIMD units of the processor cores. In such embodiments, the shaders 115 and 116, are implemented using a common set of resources that is referred to a unified shader pool.

In some embodiments, the graphics pipeline circuitry 108 implements different engines, representing different portions of the pipeline circuitry, different configurations of the circuitry, or any combination therefore. For example, in some embodiments the graphics pipeline circuitry 108 implements a compute engine used to general purpose computing on the GPU 104, and one or more of the shaders 115 and 116 are executed by the compute engine. In other embodiments, the graphics pipeline circuitry 108 includes a pixel shader stage and the shaders 115 and 116 are executed by the pixel shader stage.

In at least some embodiments, the shaders 115 and 116 perform image processing operations, such as pixel interpolation computations that generate new pixels in the screen space. Thus, in different embodiments the shaders 115 and 116 are one of a hull shader, a tessellator, a domain shader, a geometry shader and the like, or any combination thereof. Furthermore, in some cases the graphics pipeline circuitry 108 is configured to more complex image processing operations by executing different shaders in a sequence. An example is illustrated at FIG. 2 in accordance with some embodiments.

Figure 2:
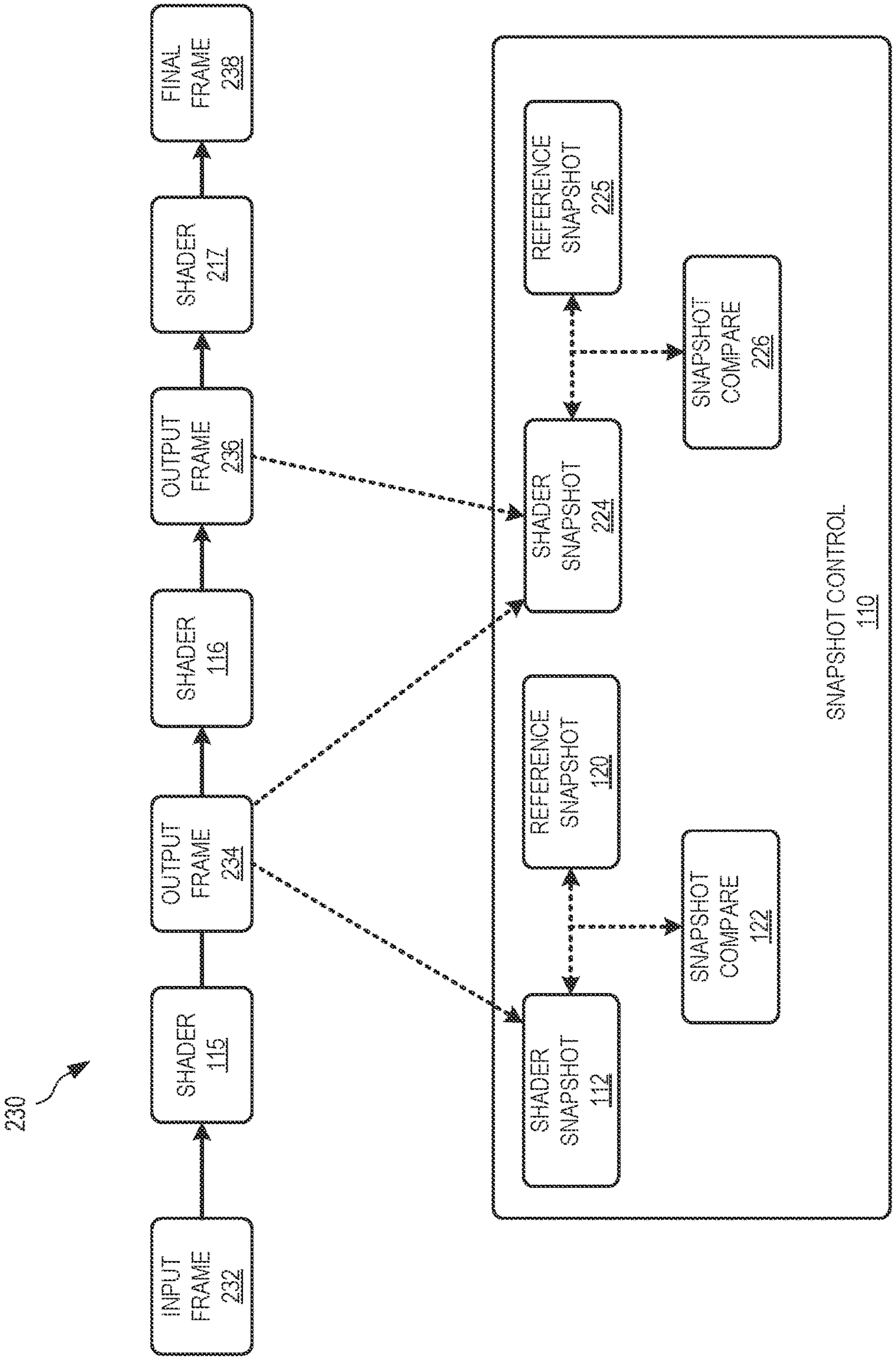
FIG. 2 illustrates an example of the processing system of FIG. 1 being employed to compare the generated snapshots to one or more reference snapshots to identify errors in the shader sequence in accordance with some embodiments.

In particular, FIG. 2 illustrates a shader sequence 230 including shaders 115, 116, and 217. The shader 115 receives input data in the form of an input frame 232. In some embodiments, the input frame 232 is a full frame of data for display. In other embodiments, the input frame 232 is a portion of frame, such as one or more primitives to be displayed. The shader 115 performs one or more image processing operations (e.g., motion estimation, histogram calculation, interpolation operations, and the like, or any combination thereof) as defined by the shader code of the shader 115 and based on the input frame 232. The shader 115 thereby generates an output frame 234. The shader 216 receives the output frame 234, performs a different set of image processing operations as defined by the corresponding shader code and based on the output frame 234. The shader 216 thereby generates an output frame 236. The shader 217 performs another set of image processing operations as defined by the shader code of the shader 217 and using the output frame 236. The shader 217 thereby generates a final frame 238. It will be appreciated that the frame 238 is a final frame only with respect to the processing of the input frame 232 at the shader sequence 230, and that in some embodiments the final frame 238 is further modified before being displayed at a display device.

Returning to FIG. 1, in some embodiments the graphics pipeline circuitry 108 is configured to execute a shader sequence in order to allow the GPU 104 to perform more complex image processing operations than can be reliably or effectively implemented by a single shader. However, if the output data of the shader sequence has an error (e.g., a visual distortion), the complexity of the shader sequence increases the difficulty of finding the source of the errors. Accordingly, to assist the shader developer or other entity in locating the source of an output error, the GPU 104 is configured to capture snapshots (e.g., snapshot 112) of data (e.g., image data) at different points in the shader sequence and compare those snapshots to corresponding reference snapshots (e.g., reference snapshot 120), wherein each reference snapshot represents the expected data at the corresponding point in the shader sequence. For each comparison, the GPU 104 stores snapshot compare results (e.g., snapshot compare results 122) that indicates whether the corresponding snapshot differs from the corresponding reference snapshot. The snapshot compare results thus indicate whether the corresponding shader is causing an error, allowing the shader developer to quickly identify which shader in a shader sequence is causing a visual artifact or other error in the output of the shader sequence.

To support generation of snapshots and comparison of those snapshots to corresponding reference snapshots, the GPU 104 includes a snapshot control function 110. In some embodiments, the snapshot control function 110 is software, and in particular is a set of instructions that manipulate the processor cores of the GPU 104 to perform snapshot operations, including capturing snapshots, comparing the snapshots to corresponding reference snapshots, and generating snapshot compare results based on the comparison. Further, although the snapshot control function 110 is illustrated as a discrete function, in some embodiments the snapshot control function 110 is integrated into the shaders 115 and 116. For example, in some embodiments the snapshot control function 110 is a set of operations that are invoked via an application program interface (API), wherein each operation is invoked by a corresponding instruction, and a shader developer includes the instructions for capturing and comparing snapshots in each of the shaders 115 and 116. In some embodiments, the snapshot control function 110 is implemented via dedicated circuitry of the GPU 104.

An example of the snapshot control function 110 being used to identify an error the shader sequence 230 is illustrated at FIG. 2. In the illustrated example, the snapshot control function 110 captures snapshots for each of the shaders 115 and 116. In particular, the snapshot control function captures the snapshot 112, representing the output frame 234 of the shader 115. The snapshot control function also captures a snapshot 224, representing the output frame of the shader 116. The snapshot control function 110 compares the snapshot 112 to the reference snapshot 120, which represents the expected output of the shader 115 when receiving the input frame 232. The snapshot control function 110 stores the results of the comparison as the snapshot compare results 122. In addition, the snapshot control function 110 compares the snapshot 224 to a reference snapshot 225, which represents the expected output of the shader 116 when receiving an error-free version of the output frame 234. The snapshot control function 110 stores the results of the comparison as snapshot comparison results 226.

In some embodiments, in response to identifying an error, such as visual artifact, in the final frame 238, a shader developer employs the snapshot comparison results 122 and 226 to identify which of the shaders 115 and 116 is not operating or designed properly. For example, if the snapshot comparison results 122 indicate that the snapshot 112 differs from the reference snapshot 120, an error in the design or operation of the shader 115 is indicated. If instead the snapshot comparison results 122 indicate that the snapshot 112 matches the reference snapshot 120 but the snapshot comparison results 226 indicate that the snapshot 224 differs from the reference snapshot 225, an error in the design or operation of the shader 116 is indicated. The shader developer then adjusts the design or operation of the shader indicated as being the source of the error. The developer is thus able to identify which shader in a sequence of shaders is causing an error in the sequence output, reducing shader development time and improving the operation of shader sequences.

Further, in some embodiments, the snapshot compare results 122 and 226 indicate what portions of the corresponding snapshot differ from the corresponding reference snapshot. For example, in some implementations each snapshot, as well as each reference snapshot, includes pixel data for an image frame, and the GPU 104 generates the snapshot compare results 122 by performing a bitwise comparison of each pixel of the snapshot 112 to each corresponding pixel of the reference snapshot 120. The snapshot compare results 122 therefore indicates which pixels of the snapshot 112 differ from the corresponding pixels of the reference snapshot 120, and how those pixels differ (that is, which bits of each pixel differ). This allows the shader developer to quickly identify where and how a particular error is occurring, thus further reducing the time and resources needed to address shader errors.

Figure 3:
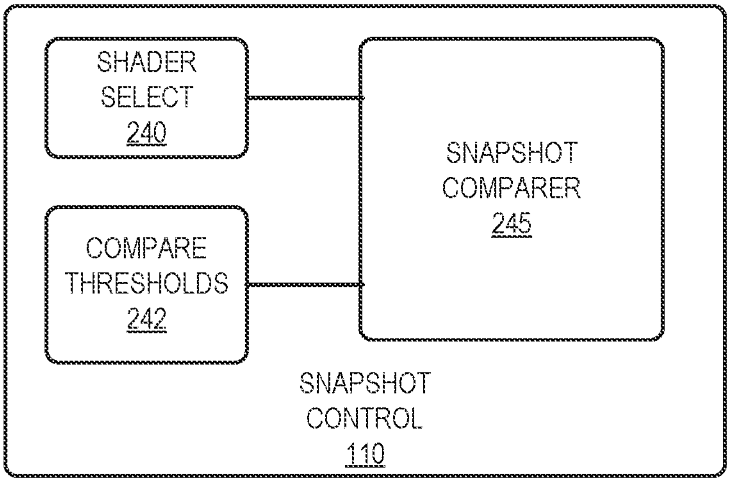
FIG. 3 is a block diagram of a snapshot control layer of the processing system of FIG. 1 in accordance with some embodiments.

FIG. 3 is a block diagram illustrating an example configuration of the snapshot control function in accordance with some embodiments. In the depicted example, the snapshot control function 110 includes shader select information 240, compare thresholds information 242, and a snapshot comparer 245. In some embodiments, the snapshot comparer 245 is a set of instructions that, when executed, 1) capture one or more snapshots of shader outputs in a shader sequence, and 2) compare each captured snapshot to a corresponding reference snapshot. The shader select information 240 and compare thresholds 242 control different aspects of the snapshot comparer 245 as described further below. In some implementations, one or both of the shader select information 240 and compare thresholds information 242 is a programmable value. For example, in some embodiments the shader select information 240 and the compare thresholds information 242 are each stored at a corresponding set of registers, and the values for each set of information are programmed by a shader issuing an instruction to store the value for a parameter at a corresponding subset of the set of registers.

The shader select information 240 indicates for which shaders in a shader sequence the snapshot comparer is to capture a snapshot. For example, in some embodiments, in response to a shader sequence being executed the snapshot comparer 245 reads the portion of the shader select information 240 corresponding to the shader sequence. To illustrate, in some embodiments each shader in a shader sequence is assigned an identifier by the CPU 102 or the GPU 104, and the shader select information 240 stores the shader identifiers for the shaders for which the snapshot comparer 245 is to capture snapshots. The snapshot comparer reads the shader select information 240 and captures snapshots only for those shaders in a shader sequence that have shader identifiers stored at the shader select information 240. The shader select information 240 thus provides a way for a shader developer (e.g., by programming a specified value to the shader select information 240) to only capture snapshots for a subset (e.g., less than all) of the shaders in a shader sequence. For example, if the shader developer believes that the source of a given error is likely to be in one of N shaders of a shader sequence having M shaders (where M is greater than N), the shader developer programs a value to the shader select information 240 so that the snapshot comparer only captures snapshots for the N shaders.

The compare thresholds information 242 indicates thresholds for comparisons performed by the snapshot comparer 245. To illustrate, in some embodiments the snapshot comparer 245 indicates a match between a particular data item (e.g., a pixel) in a snapshot and a corresponding data item in the associated reference snapshot if the two data items (e.g., the two pixel values) have values that fall within the threshold indicated by the compare thresholds information 242. For example, in some embodiments the compare thresholds information 242 store information to indicate that the snapshot comparer 245 is to identify a match between a pixel of a snapshot and a corresponding pixel of the reference snapshot if the pixel values are within X % of each other, wherein X is a programmable value.

The compare thresholds information 242 thus provides a way for the shader developer to account for potential differences between a snapshot and a reference snapshot that are not the result of an error at the corresponding shader. For example, in some cases the reference snapshot 120 is generated by a program executing at the CPU 102 and the snapshot 112 is generated by the GPU 104. Furthermore, in some embodiments, the CPU 102 implements different data rounding functionality than the GPU 104, such that one or more values of the reference snapshot 120 differ from values of the snapshot 112 by a relatively small amount, even though each of the values was correctly generated (that is, none of the values is in error). In such cases, the shader developer programs the values of the compare thresholds 242 so that the snapshot comparer 245 indicates a match between values when the different values are within a specified tolerance.

Figure 4:
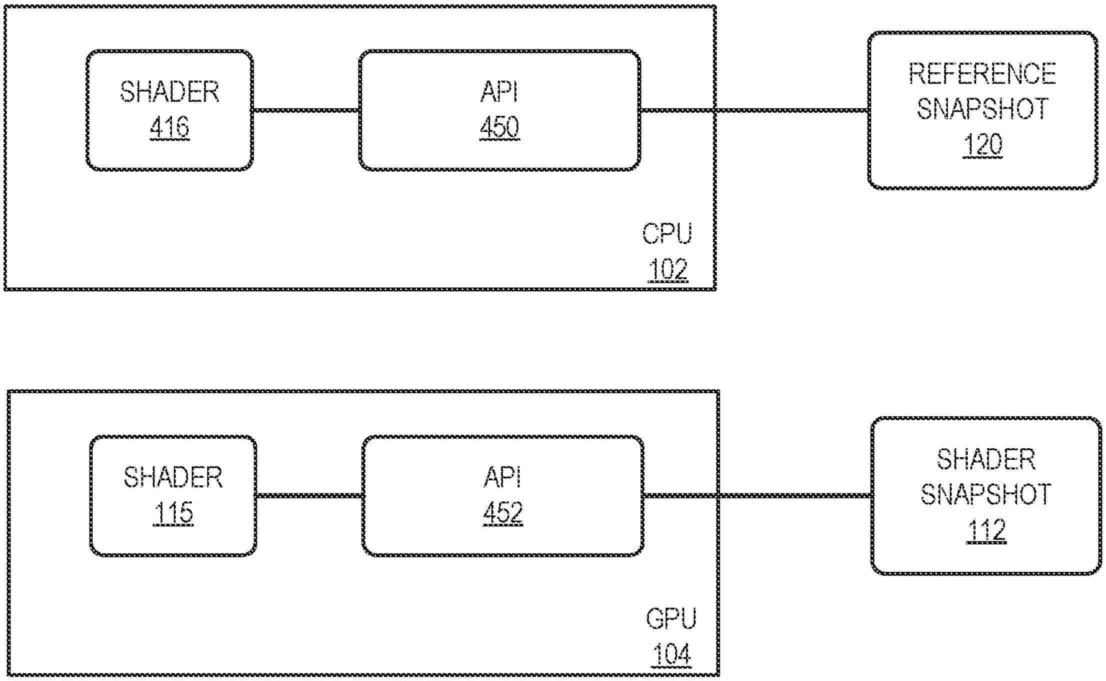
FIG. 4 is a diagram illustrating an example of generating a shader sequence snapshot and a corresponding reference snapshot at the processing system of FIG. 1 in accordance with some embodiments.

As explained above, the snapshot control functionality 110 is generally configured to compare snapshots of shader outputs to corresponding reference snapshots. In some embodiments, a reference snapshot is generated by a different shader and using a different framework, such as a different API, than is used to generate the corresponding snapshot. An example is illustrated at FIG. 4 in accordance with some embodiments. In the illustrated example, the reference snapshot 120 is generated by a shader 416 that is executed at the CPU 102 and using an API 450. In contrast, the snapshot 112 is generated by the shader 115 executing at the GPU 104 and using an API 452 that is different from the API 450. For example, in some embodiments the API 450 is one of a High-Level Shader Language (HLSL), Vulkan, or OpenCI API, and the API 452 is a different one of the above-referenced APIs.

By generating the reference snapshot 120 with a different framework than is used to generate the snapshot 112, a shader developer is able to ensure relatively high reliability for the reference snapshot 120—that is, is able to ensure that the reference snapshot is highly likely to be free of errors, and therefore the comparison between the reference snapshot 120 and the snapshot 112 is highly likely to indicate any errors in the snapshot 112. For example, in some embodiments the shader 416 is programmed by the shader developer such that the shader 416 has relatively low performance (e.g., generates the reference snapshot 120 relatively slowly) but relatively high reliability, so that the reference snapshot 120 is unlikely to have any errors. In contrast, the shader 115 is programmed to have relatively high performance (e.g., generates the snapshot 112 more quickly than the shader 416 generates the reference snapshot 120) but has relatively low reliability, at least in its initial iteration. The shader developer uses the comparisons between the shader snapshot 112 and the reference snapshot 120 to identify errors in the shader 115 and adjust the shader 115 to correct those errors, until the shader 115 is as reliable (or nearly as reliable) as the shader 416. The shader developer thus leverages the reliability of the shader 416 to improve the reliability of the higher-performing shader 115.

Figure 5:
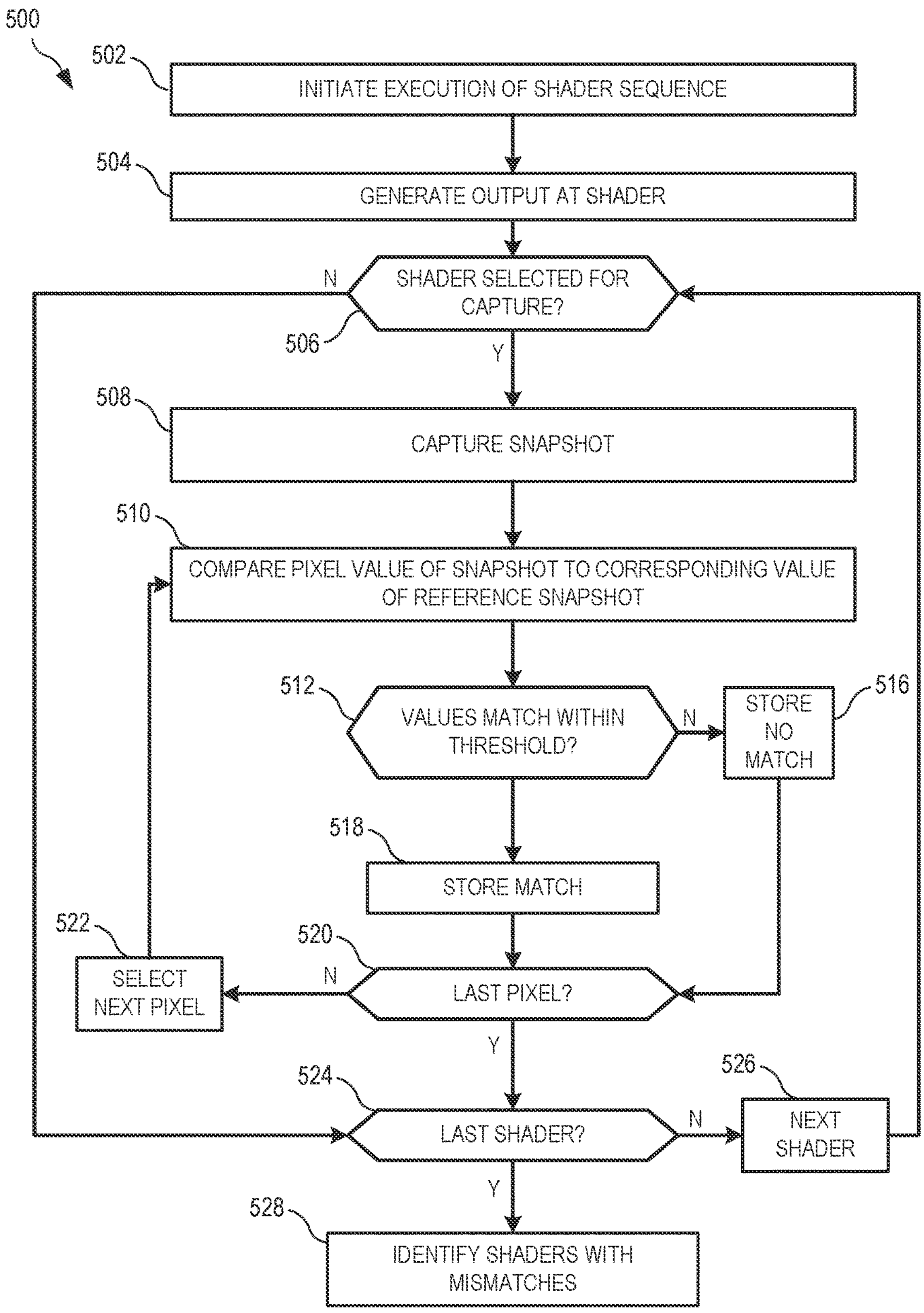
FIG. 5 is a flow diagram of a method of comparing snapshots of an image frame at different points in a shader sequence with corresponding reference snapshots in accordance with some embodiments.

FIG. 5 illustrates a flow diagram of a method 500 of capturing and comparing snapshots at a shader sequence in accordance with some embodiments. For purposes of description, the method 500 is described with respect to an example implementation at the processing system 100 of FIG. 1. However, it will be appreciated that in other embodiments, the method 500 is implemented at a processing system having a different configuration. At block 502, the GPU 104 initiates execution of a sequence of shaders, such as the shader sequence 230 of FIG. 2. At block 504, an initial shader in the sequence generates an output frame. For example, shader 115 generates the output frame 234.

At block 506, the snapshot control function 110 determines, based on the shader select information 240, whether the current shader (that is, the shader that generated the output frame at block 504) is selected for snapshot capture. For example, the snapshot control function 110 determines whether the shader select information 240 includes an identifier for the current shader. If not, the method flow moves to block 524, described below.

If the shader select information 240 includes the identifier for the current shader (indicating that the shader is selected for snapshot capture), the method flow moves to block 508 and the snapshot control function 110 captures a snapshot for the current shader. In some embodiments, the snapshot control function 110 captures the snapshot by storing at least a portion of the output frame for the shader at the memory 106. In some embodiments the snapshot for a shader includes all of the frame data, including all pixel values, generated by the corresponding shader. In other embodiments, the snapshot control function 110 stores only a portion of the output data for a shader, such as only the pixel data generated by a shader, such that the corresponding snapshot does not include non-pixel information. In still other embodiments, the snapshot control function 110 stores the snapshot to include information in addition to any pixel data. For example, in some embodiments the snapshot includes shader input information, shader parameter information, and the like, or any combination thereof.

The method proceeds to block 510, where the snapshot control function 110 initiates comparison of a snapshot to a corresponding reference snapshot. In particular, the snapshot control function 110 selects an initial item of data, such as an initial pixel value, and compares the selected item to a corresponding item (e.g., a corresponding pixel) of the reference snapshot. The method flow proceeds to block 512 and the snapshot control function 110 determines whether the selected data items match within a threshold indicated by the compare thresholds information 242. If so, the method flow moves to block 518 and the snapshot control function 110 updates the snapshot compare results to indicate a match for the selected data items (e.g., the selected pixels). If, at block 512, the snapshot control function 110 determines that the selected data items do not match within the identified threshold, the method flow moves to block 516 and the snapshot control function 110 updates the snapshot compare results to indicate a mismatch for the selected data items.

After updating the snapshot compare results with an indication of a match or of a mismatch, the method flow moves to block 520 and the snapshot control function 110 determines whether the last data item (e.g., the last pixel) of the snapshot has been compared. That is, the snapshot control function 110 determines whether all data items (e.g., all pixels) of the snapshot have been compared to corresponding data items of the reference snapshot. If not, the method flow moves to block 522 and the snapshot control function 110 selects the next data item. The method then returns to block 510 for the next comparison.

If, at block 520, the snapshot control function 110 determines that all data items (e.g., all pixels) of the snapshot have been compared to corresponding data items of the reference snapshot, the method flow moves to block 524 and the snapshot control function 110 determines whether all of the shaders in the shader sequence have generated an output frame. If not, the method flow moves to block 526 and the snapshot control function 110 selects the next shader in the shader sequence. The method flow then returns to block 506. If, at block 524, the snapshot control function 110 determines that all of the shaders in the shader sequence have generated an output frame and all selected shaders have had their snapshots compared to corresponding reference snapshots, the method flow moves to block 528 and snapshot control function 110 identifies those shaders that have generated snapshots including mismatches with the corresponding reference snapshots. For example, in some embodiments the snapshot control function 110 stores a list of the shader identifiers for which mismatches have been identified. A shader developer employs the list to determine the first shader in the shader sequence for which there is a mismatch, and thus determines the likely source of any error in the final output frame.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

One or more of the elements described above is circuitry designed and configured to perform the corresponding operations described above. Such circuitry, in at least some implementations, is any one of, or a combination of, a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components," "units," "devices," "circuitry," etc.) are described or claimed as "configured" to perform one or more tasks or operations. This formulation—[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

generating, at a first shader of a first processing unit, a first snapshot representing an output of the first shader based on a frame, the first shader executing first code configured to perform an image processing operation;

generating, using second code different from the first code, a first reference snapshot corresponding to the output of the first shader, the second code being configured to perform the image processing operation; and validating the output of the first shader based on a comparison of the first snapshot with the first reference snapshot.

2. The method of claim 1, wherein the first processing unit comprises a graphics processing unit and the first reference snapshot is generated at a second processing unit comprising a central processing unit.

3. The method of claim 1, wherein:

the first code comprises a first application program interface (API); and the second code comprises a second API different from the first API.

4. The method of claim 1, further comprising:

generating, at a second shader, a second snapshot representing an output of the second shader based on the frame; and validating the output of the second shader based on a comparison of the second snapshot with a second reference snapshot.

5. The method of claim 4, further comprising:

selecting the first shader and the second shader to store the first and second snapshots based on programmable snapshot control information.

6. The method of claim 1, wherein validating the output of the first shader comprises:

comparing the output of the first shader to the first reference snapshot based on an error tolerance threshold.

7. The method of claim 1, wherein the first snapshot includes input data for the first shader to generate the first snapshot.

8. The method of claim 1, wherein:

generating the first snapshot comprises generating the first snapshot via a first programming framework; and the first reference snapshot is generated at via second programming framework different from the first programming framework.

9. The method of claim 1, further comprising:

generating, at a second shader, a second snapshot representing an output of the second shader; and validating the second snapshot based on a comparison of the second snapshot to a second reference snapshot.

10. A method comprising:

generating, at a first shader of a sequence of shaders, a first snapshot representing an output of the first shader based on a frame, the first shader comprises first shader code to perform an image processing operation; and validating the output of the first shader based on a comparison of the first snapshot with a first reference snapshot, the first reference snapshot is generated with second shader code to perform the image processing operation, the second shader code different from the first shader code.

11. A device, comprising:

a first processing unit configured to generate, at a first shader, a first snapshot representing an output of the first shader based on a frame, the first shader being configured to execute first code to perform an image processing operation; and a second processing unit configured to execute second code, different from the first code and configured to perform the image processing operation, to generate a first reference snapshot corresponding to the output of the first shader, and to validate the output of the first shader based on a comparison of the first snapshot with the first reference snapshot.

12. The device of claim 11, wherein the first processing unit comprises a graphics processing unit and the first reference snapshot is generated at the second processing unit comprising a central processing unit.

13. The device of claim 11, wherein the first processing unit is configured to generate the first snapshot via a first application program interface (API); and the first reference snapshot is generated via a second API different from the first API.

14. A non-transitory computer readable medium embodying a set of executable instructions, the set of executable instructions to manipulate at least one processor to generate, at a first shader of a sequence of shaders of a first processor and using first code configured to perform an image processing operation, a first snapshot representing an output of the first shader based on a frame;

generate, using second code different from the first code, a first reference snapshot corresponding to the output of the first shader, the second code being configured to perform the image processing operation; and validate the output of the first shader based on a comparison of the first snapshot with the first reference snapshot.

15. The non-transitory computer readable medium of claim 14, wherein the first processor comprises a graphics processing unit and a second processor comprises a central processing unit.

16. The non-transitory computer readable medium of claim 14, wherein:

the first code comprises a first application program interface (API); and the second code comprises a second API different from the first API.

17. The non-transitory computer readable medium of claim 14, further comprising instructions to:

generate, at a second shader, a second snapshot representing an output of the second shader based on the frame; and validate the output of the second shader based on a comparison of the second snapshot with a second reference snapshot.

18. The non-transitory computer readable medium of claim 17, further comprising instructions to:

select the first shader and the second shader to store the first and second snapshots based on programmable snapshot control information.

19. The non-transitory computer readable medium of claim 14, wherein the instructions to validate the output of the first shader comprise instructions to:

compare the output of the first shader to the first reference snapshot based on an error tolerance threshold.

20. The non-transitory computer readable medium of claim 14, wherein the first snapshot includes input data for the first shader to generate the first snapshot.

* * * * *